United States Patent [19]

Belliston

[11] 4,145,810

[45] Mar. 27, 1979

[54] ATTACHMENT FOR HEDGE TRIMMERS

[75] Inventor: Earl L. Belliston, Nephi, Utah

[73] Assignee: Betty Hardman, Salt Lake City, Utah

[21] Appl. No.: 830,096

[22] Filed: Sep. 2, 1977

[51] Int. Cl.² ............................................. B26B 27/00
[52] U.S. Cl. .................................................. 30/296 R
[58] Field of Search ................. 30/296 R, 296 A, 276, 30/166 R, 166 A

[56] References Cited

U.S. PATENT DOCUMENTS

| 549,100 | 11/1895 | Bode | 30/276 X |
|---|---|---|---|
| 1,277,479 | 9/1918 | Ritchie | 30/296 R |
| 2,062,820 | 12/1936 | Pierce | 30/276 |
| 2,263,431 | 11/1941 | White | 30/276 X |
| 2,597,774 | 5/1952 | Britten | 30/276 X |
| 3,050,854 | 8/1962 | Becker et al. | 30/276 |
| 3,218,789 | 11/1965 | Ott et al. | 30/276 UX |
| 3,219,129 | 11/1965 | Yamada | 30/296 R |
| 3,795,281 | 3/1974 | Cloran | 30/296 R |
| 3,838,508 | 10/1974 | Turner | 30/216 |
| 3,985,188 | 10/1976 | Steele | 30/296 R |

FOREIGN PATENT DOCUMENTS

| 578130 | 6/1946 | United Kingdom | 30/309 |
|---|---|---|---|
| 1377386 | 12/1974 | United Kingdom | 30/296 R |

Primary Examiner—James L. Jones, Jr.
Assistant Examiner—J. T. Zatarga
Attorney, Agent, or Firm—Criddle, Thorpe & Western

[57] ABSTRACT

An attachment for a powered hedge trimmer for enabling a user to reach difficult trimming locations for cutting hedge, grass, weeds, etc., without excessive bending or reaching. The attachment is connected directly to the trimmer body and forms either a telescoping, elongate handle or a short, single handle for one-handed use. With the elongate handle attached, a sliding, adjustable brace permits selection of different cutting angles to meet the needs of various hedge trimming sites. With the elongate handle removed, the brace can be attached to the trimmer body to form a handle adapted for one-handed use.

4 Claims, 3 Drawing Figures

ATTACHMENT FOR HEDGE TRIMMERS

BACKGROUND OF THE INVENTION

1. Field of the Invention

The present invention relates to attachments for powered hedge-trimming equipment. More particularly, the invention pertains to adjustable attachments which enable the user to modify the attachment configuration to facilitate hedge trimmer use in a variety of trimming sites.

2. Prior Art

With the advent of powered hand tools for yardwork, such activity which has heretofore been too physically demanding or time consuming has now been brought within the capability of an expanding class of individuals. Although the powered cutting edge has eliminated considerable physical exertion, the use of many of these tools remains somewhat awkward. For example, such landscaping equipment as hedge trimmers is structurally designed to be held with both hands and operated within the individual's immediate reach. As a consequence, the user must frequently contend with inaccessible trimming locations which require considerable bending and reaching.

Furthermore, when trimming shrubbery which stands beyond the reach of the user, stepladders and similar items must be used to complete the trimming operation. Not only does this type of activity cause inconvenience to the user, but the concurrent stretching and climbing may expose the person to unnecessary risks. These dangers are compounded by the fact that such power tools may continue to operate during a fall, resulting in additional injury by the cutting teeth of the power tool.

OBJECTS AND SUMMARY OF THE INVENTION

It is an object of the present invention to provide an adjustable handle means adapted for attachment to a hedge trimmer or similarly configured hand tool for extending the reaching ability of the user of the tool.

It is a further object of the present invention to provide such a handle means which is adaptable for preselection of cutting angle.

It is a still further objective to provide such handle means which gives extended reaching capability, but easily converts to a short handle configuration for one-handed use.

These objectives are realized in an attachment which comprises a pair of coupling forks which are mounted at a forward portion of the hedge trimmer. One of these forks is pivotally attached at the fork end and coupled to an elongate handle which is made of telescoping tube sections to provide adjustability in length. A brace means is pivotally connected at one end to a rearward portion of the trimmer and is slidably connected at the other end to the elongate handle means. A locking bolt or similar device enables the slidable connection to be locked at a given elevation to preselect the cutting angle of the trimmer. With the use of this elongate arm, a user can reach high locations on shrubbery and other difficult trimming sites without the need of climbing or excessive reaching. Likewise, low level trimming can be accomplished by adjusting the cutting angle to thereby obviate the need for excessive bending and stooping during trimming operations.

For normal operation, the user may quickly remove the elongate handle and contact the base means to a second coupling fork which is connected at a forward portion of the trimmer. In this short-handle configuration the user has improved agility with the trimmer with less wrist strain and inconvenience. The invention therefore provides a single handle means which is capable of being adapted for remote cutting operations requiring an elongated handle or one-handed use for more proximate cutting locations.

Other objects and features will be obvious to a person skilled in the art from the following detailed description, taken with the accompanying drawings.

DETAILED DESCRIPTION OF THE INVENTION

Figure 1:
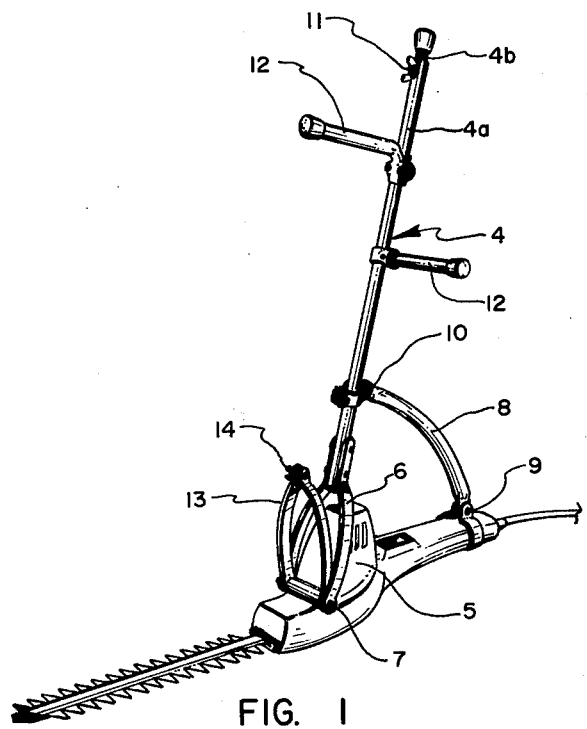
FIG. 1 shows a perspective view of the subject invention in combination with a typical hedge trimming device.

Referring now to the drawings:

In accordance with the present invention an elongate handle 4 is attached to a hedge trimming device 5 by means of a fork member 6 which is bolted to the body of the hedge trimmer. The bolted connection permits pivotal motion about the axis defined by bolt 7. This pivotal action is necessary to facilitate the adjustment of cutting level as illustrated by the different configurations shown in FIGS. 1 and 2.

To stabilize the elongate handle 4 in relation to the cutting instrument, a brace means 8 is affixed at one end to a rearward portion of the trimmer, the opposite end being slidably clamped to the elongate handle 4. The connection of the brace means at the rearward location 9 on the trimmer must enable pivotal movement of the brace within the plane defined by the attached brace 8 and elongate handle 4 structure. The connection at the elongate handle 4 is accomplished by attaching a slidable clamp 10 around the tube section 4 and pivotally connecting the clamp and brace means. This configuration permits the clamp to be adjusted to an appropriate elevation along the tube section and then secured in place by means of an adjustable lock means such as a locking nut and/or bolt.

To extend reaching capability, a telescoping configuration is used for the elongate handle 4. The first tube member 4a has a larger diameter, permitting a second tube member 4b to be enclosed therein. This second tube member is slidably disposed therein and can be extended to lengthen the reach of the user.

To secure the extended tube length, a series of transverse diagonal eyelets are located along the length of the enclosed tube 4b. A set of these eyelets can then be aligned with a single eyelet set on the first tube member 4a and a nut and bolt 11 can be inserted therein to secure this position.

As an additional aid to improve control of the trimmer when the elongate handle is in the attached configuration, one or more handle means 12 may be clamped to the tube sections 4. When attached by clamp means, these handles can be swiveled to a variety of radial locations to obtain the best leverage for a particular cutting elevation.

Figure 3:
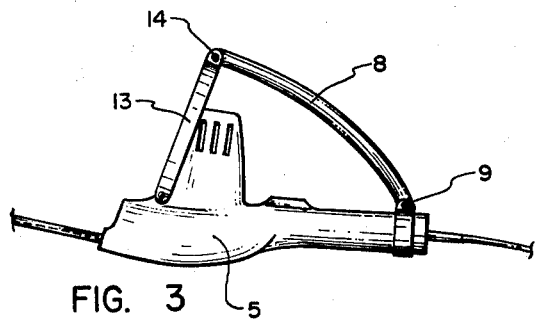
FIG. 3 discloses the short handle configuration, in which the elongate handle has been removed and the brace means is connected to a suitable coupling fork.

For those applications which do not require the user to reach or stoop to inconvenient cutting positions, the subject invention is adapted for one-handed use. This configuration, herein referred to as the "removed configuration," is illustrated in FIG. 3. With the elongate handle removed, the slidable end of the brace means is unconnected. To form the desired single handle, this free end is attached to a second coupling fork 13 which is attached to the forward portion of the trimmer in common with the first coupling fork 6 and bolt 7 therethrough. Although this second coupling fork may likewise be pivotally attached to the trimmer body, it is preferred to have this fork abutting the front portion of the trimmer body to eliminate free play within the short handle. With the brace means 8 secured to the second coupling fork 13 at point 14, the user has an accessible handle which enables one-handed use of the trimmer device. This same handle configuration of FIG. 3 provides improved control for close, two-handed trimming operations as well.

Figure 2:
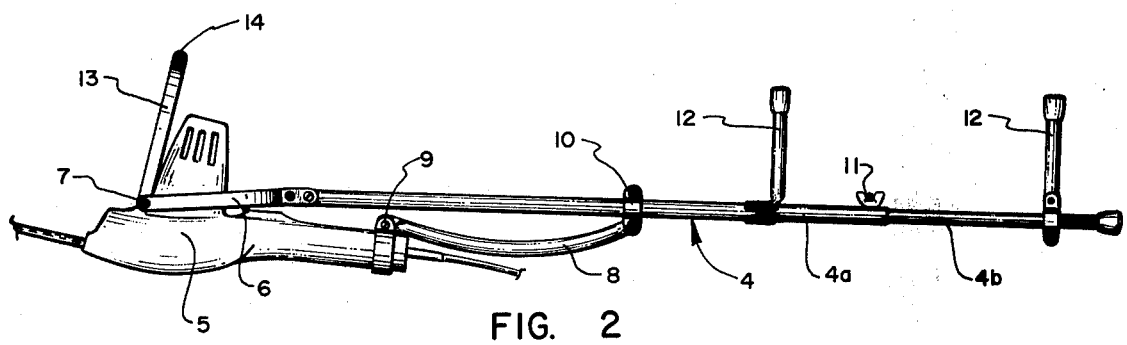
FIG. 2 illustrates the elongate handle when in an extended configuration, with the brace means locked at a maximum elevation along the tube section.

It will be apparent that numerous variations of structure can implement the concept of the present invention. For example, the pair of coupling forks illustrated in the Figures can be modified to a single coupling fork which operates to receive either the elongate handle means or the brace means to form the short handle. In either case, it is preferred to have slot means at the forked end 7 which can locate at an already existing slot means through the trimming device, the combination being adapted to receive a single bolt for securing the coupling fork means to the trimmer body. As indicated in FIGS. 1 and 2, this attachment may be pivotal with respect to both or either of the coupling forks.

Furthermore, although the structure illustrated in the attached Figures is specifically adapted for a hedge trimming device such as that commercially available from Black and Decker, this same inventive concept can be applied to other configurations by minor modification of the elements discussed herein. It is to be understood, therefore, that the present disclosure is by way of example and that variations are possible without departing from the scope of the hereinafter claimed subject matter.

I claim:

1. An attachment for a powered hedge trimmer for enabling a user to reach difficult trimming locations without excessive bending or reaching, including:
   (a) coupling fork means having a forked end with means therein for removable, pivotal attachment to said trimmer;
   (b) elongate handle means comprising a first tube member and a second tube member telescopically disposed within said first tube member, said first tube member having means at one end thereof for attachment to an upper end of said fork means; and
   (c) brace means adapted with means for pivotal attachment at one end thereof to a rearward portion of said trimmer, the other end of said brace means including means for attachment at either said first tube member when said elongate handle means is attached to the fork means or at said upper end of the fork means when said elongate handle is not attached to the fork means.

2. An attachment as defined in claim 1, wherein said coupling fork means comprises first and second coupling forks, said first fork having an upper end for attachment of said brace means when the elongate handle means is not attached to the fork means, said second fork having means for attachment at the upper end thereof to said elongate handle means.

3. An attachment as defined in claim 1, wherein said elongate handle means further comprises at least one lateral handle means connected to and extending radially from said tube section.

4. An attachment as defined in claim 1, wherein said means for attachment of said brace means comprises a slidable clamp.

* * * * *